J. V. RICE, Jr.
GAS ENGINE.
APPLICATION FILED AUG. 24, 1909.
958,975.
Patented May 24, 1910.
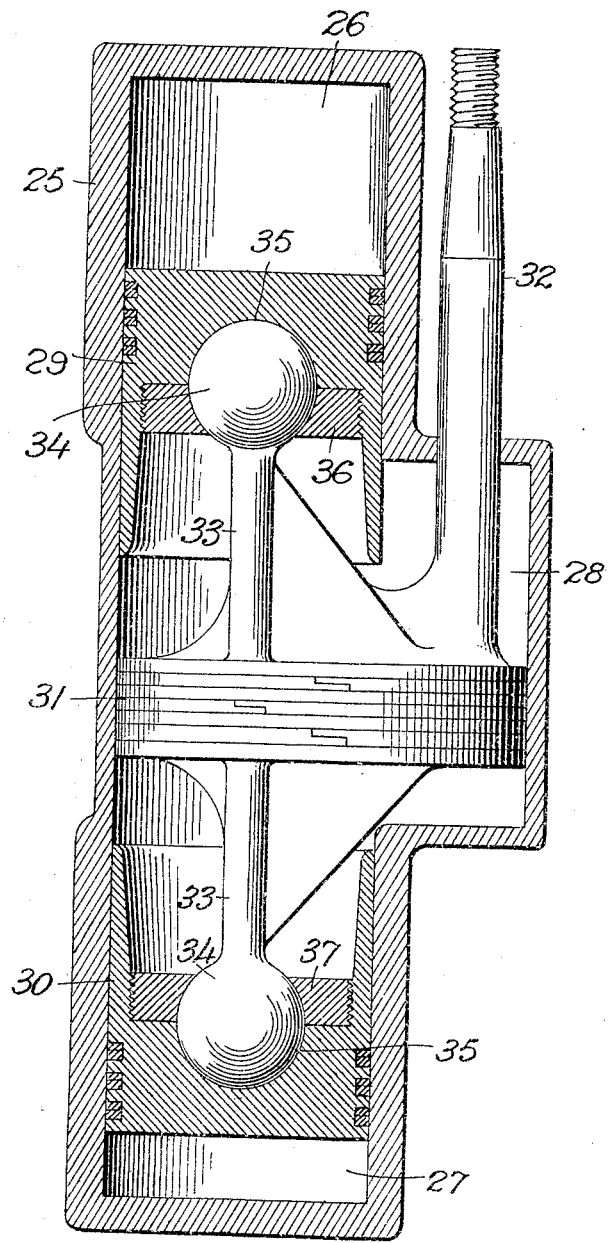
WITNESSES:
INVENTOR
John V. Rice Jr.
ATTORNEY

UNITED STATES PATENT OFFICE.

JOHN V. RICE, JR., OF BORDENTOWN, NEW JERSEY, ASSIGNOR TO RICE GAS ENGINE COMPANY, OF BORDENTOWN, NEW JERSEY, A CORPORATION OF NEW JERSEY.

GAS-ENGINE.

958,975.

Specification of Letters Patent.

Patented May 24, 1910.

Application filed August 24, 1909. Serial No. 514,369.

*To all whom it may concern:*

Be it known that I, JOHN V. RICE, Jr., citizen of the United States of America, residing at Bordentown, in the county of Burlington and State of New Jersey, have invented certain new and useful Improvements in Gas-Engines, of which the following is a specification, reference being had therein to the accompanying drawing.

This invention relates to certain new and useful improvements in pistons for gas engines.

The object is to enable the parts of a compound piston to be so connected to the intermediate element as that the portions of the piston which contact with the cylinder may be automatically adjusted, and able to compensate for any loss or wear through friction, and to enable a complete and efficient contact between the piston and the walls of the cylinder to be maintained at all times. And the invention therefore consists essentially in the construction, arrangement and combination of parts substantially as will be hereinafter described and claimed.

In the accompanying drawing, illustrating my invention, the single figure indicates a sectional view of a gas engine cylinder in which my improved piston is fitted.

The present invention is primarily an improvement upon the gas engine described and claimed in my co-pending application for Letters Patent on internal combustion engine, filed September 16, 1905, Serial No. 278,735, allowed March 29, 1909; but it is obvious that the invention may be employed successfully with other forms of gas engines than the particular one contained in the said application.

25 designates a cylinder having at its extreme ends explosion chambers 26 and 27 arranged in alinement with each other, and having intermediate of its ends an enlarged compression chamber 28. Good practice and machine design dictate that the chambers 26, 27 and 28 should be internally cylindrical, and that the cylindrical chamber 28 should be arranged eccentrically in respect to the chambers 26 and 27, and such a construction is therefore chosen for the purposes of illustration, but the invention is, of course, not intended to be limited to this particular embodiment. Arranged for coöperation with the described cylinder is a piston having its end portions 29 and 30 properly fitted to the explosion chambers 26 and 27, and having an enlarged offset intermediate portion 31 properly fitted to the eccentric compression chamber 28. The piston ends 29 and 30 and the intermediate portion 31 are shown as provided with packing rings and as externally cylindrical, so as to suit them for coöperation with the chambers 26, 27 and 28.

32 denotes a piston rod applied to the intermediate portion 31 of the piston and suitably arranged for proper operation.

The intermediate portion 31 of the piston is provided with upper and lower extensions 33 which may partake of any desired form, being wing-like or rod-like, and these extensions 33 terminate in balls 34 that loosely connect with recesses 35 in the piston ends 29 and 30. In this way, the piston will be seen to be composed essentially of the two end portions and the central portion. The latter may be connected loosely by a universal or ball and socket joint with the end portions, as indicated in the specimen of the invention illustrated in the drawing. This loose connection between the piston ends and the central portion thereof, to which the piston rod is affixed, enables me to attain many very desirable results in the operation of a gas engine piston, for with a loose connection of this kind between the end portions and the central portion of the piston, said end portions are enabled to automatically adjust themselves to the walls of the cylinder 25, so that the cylindrical surfaces of said portions are kept in contact substantially throughout their entire length with the adjoining cylindrical walls of the bore of the cylinder, and hence wear on any particular point is avoided. Were the connections between the end portion and the central portion of the piston hard and rigid and no flexibility were permitted, it might be found that these end portions would be contacting at only one or two points and thereby leakage might occur, and other disadvantageous circumstances exist inimical to the successful operation of the piston and engine; but by the use of the ball and socket joint which permits the end portions of the pistons to automatically adjust their contact with the cylinder walls, it will be found that the operation will be very successful and a tight and efficient joint will be maintained at all times, or that the contact of the surfaces of the end portions of the piston will be complete and tight with the adjoining walls of the cylinder. Thus the lateral pressure is equally distributed over the piston walls, and there is no tilting action in the piston, the tilting tendency being avoided.

Of course, the recesses 35 in the end portions 29 and 30 of the pistons may vary in size and form. I find it convenient to employ disks 36 and 37, having recessed openings and passages therein which will conform in shape to a part of the spherical surfaces of the balls 34 which can be screwed into recesses on the inner ends of the piston portions 29 and 30, as shown in the drawing, for the purpose of connecting the balls 34 to the piston parts 29 and 30. Thus in assembling the parts the balls 34 will be caused to enter the recesses 35, and then the disks 36 and 37 will be screwed into place.

Many changes may be made in the exact construction and combination of the parts without exceeding the scope of the invention.

Having thus described my invention, what I claim as new and desire to secure by Letters Patent, is:

1. In a gas engine, the combination with a cylinder, of a piston having end sections and an intermediate part, said intermediate part being loosely connected with the end sections, and a piston rod connected to one side of the said intermediate part.

2. The combination in a gas engine with a cylinder, of a piston having end sections and a central portion loosely connected to said end sections, said end and central parts being cylindrical but the central part being eccentric to the others, and a piston rod connected to said eccentric center part.

3. The combination with the cylinder of a gas engine, of a piston consisting of separate ends and a central part having balls loosely entering sockets in said ends, and a piston rod connected to one side of the said central part.

4. In a gas engine, the combination with a cylinder, of a piston having separate ends, a central part having balls loosely entering sockets in said ends, together with a piston rod applied to said central part.

5. In an internal combustion engine, the combination with a cylinder having an eccentric compression chamber between its ends, of a piston in said cylinder having separate ends and a central portion connected by ball and socket joints with said ends, said central portion being eccentric and fitted within said compression chamber.

6. The combination in an internal combustion engine, of a cylinder having closed ends forming explosion chambers, and having also intermediate between its ends an eccentric compression chamber, and a piston in the said cylinder having its ends fitted to the said explosion chambers and having also an intermediate eccentric portion fitted to the said compression chamber, and balls on said intermediate eccentric portion engaging sockets in the end portions of the piston so that there may be a loose connection between the center and end of the piston to permit said ends to be automatically adjustable to the walls of the cylinder.

7. In a gas engine, the combination with a cylinder, of a piston having an intermediate part and end sections loosely connected thereto, and a piston rod connected at one side of said piston at a point between its ends.

In testimony whereof I affix my signature in presence of two witnesses.

JOHN V. RICE, Jr.

Witnesses:
FRANK PAUL,
C. B. SCHROEDER.